（12) United States Patent
Patel et al.

(10) Patent No.: US 8,769,628 B2
(45) Date of Patent: Jul. 1, 2014

(54) REMOTE ACCESS TO A DATA STORAGE DEVICE

(75) Inventors: Shalin Patel, Mountain View, CA (US);
Hagai Heshes, San Jose, CA (US);
Noam Kedem, Foster City, CA (US);
Dotan Koren, Los Altos, CA (US)

(73) Assignee: Sandisk Technologies Inc., Plano, TX (US)

( * ) Notice: Subject to any disclaimer, the term of this patent is extended or adjusted under 35 U.S.C. 154(b) by 173 days.

(21) Appl. No.: 13/335,571

(22) Filed: Dec. 22, 2011

(65) Prior Publication Data

US 2013/0167201 A1 Jun. 27, 2013

(51) Int. Cl.
*G06F 17/30* (2006.01)

(52) U.S. Cl.
USPC .......................................................... 726/4

(58) Field of Classification Search
USPC .......................................................... 726/4
See application file for complete search history.

(56) References Cited

U.S. PATENT DOCUMENTS

| 7,783,794 | B2 | 8/2010 | Hung |
| 2006/0107062 | A1 | 5/2006 | Fauthoux |
| 2007/0101163 | A1 | 5/2007 | Ando et al. |
| 2009/0172219 | A1* | 7/2009 | Mardiks .......................... 710/67 |
| 2009/0183254 | A1 | 7/2009 | Franco et al. |
| 2009/0287792 | A1 | 11/2009 | Kim et al. |
| 2010/0083352 | A1* | 4/2010 | Arnison .......................... 726/4 |
| 2011/0131344 | A1* | 6/2011 | Kweon .......................... 710/5 |
| 2011/0277022 | A1* | 11/2011 | Weizman .......................... 726/7 |

FOREIGN PATENT DOCUMENTS

EP 2328306 A1 6/2011

OTHER PUBLICATIONS

The International Search Report and Written Opinion mailed Mar. 8, 2013 in International Application No. PCT/US2012/065817, 16 pages.
Perkins, Charles E. "Mobile IP," IEEE Communications Magazine, vol. 35, No. 5, May 1997, pp. 84-86, 91-99.
FileReflex, http://www.filereflex.com, printed Aug. 23, 2011, 1 page.

* cited by examiner

*Primary Examiner* — Teshome Hailu
*Assistant Examiner* — Abiy Getachew
(74) *Attorney, Agent, or Firm* — Toler Law Group, PC (57) ABSTRACT

A method may be performed in a data storage device that stores one or more files and that is operatively coupled to any host device that is accessible to another device via a network. The method includes receiving an access request originating from the other device. The access request is received via a particular host device registered as a recipient of requests for access to the data storage device via the network while the data storage device is operatively coupled to the host device and while the host device is accessible via the network. The method also includes, in response to receiving the access request, sending a response with access information to the other device. The response is provided to the particular host device to be sent to the other device via the network.

25 Claims, 4 Drawing Sheets

REMOTE ACCESS TO A DATA STORAGE DEVICE

FIELD OF THE DISCLOSURE

The present disclosure is generally related to storing and retrieving data.

BACKGROUND

Non-volatile data storage devices, such as universal serial bus (USB) flash memory devices, removable storage cards, and solid state drives (SSD), have allowed for increased portability of data and software applications. In addition, portable devices such as mobile telephones commonly include still image, video, and audio recording capabilities but have limited memory for storage of media content. Such portable devices often lack common memory device connectors, such as USB connectors, causing inconvenience to users of the portable devices when attempting to acquire data from or transfer data to the devices.

SUMMARY

Systems and methods enable data transfer to and from a data storage device, such as a USB flash drive, that may be coupled to any host device having access to a network. A host device that has been coupled to the data storage device may register as a host of the data storage device, enabling a remote device also having access to the network, such as a mobile telephone or personal computer, to access the data storage device via the host device. Data transfer may be initiated at the host device to pull data from the remote device for storage at the data storage device or to push data that is retrieved from the data storage device to the remote device. Alternatively, or in addition, data transfer may be initiated at the remote device to pull data from the data storage device or to push data for storage at the data storage device.

DETAILED DESCRIPTION

Figure 1:
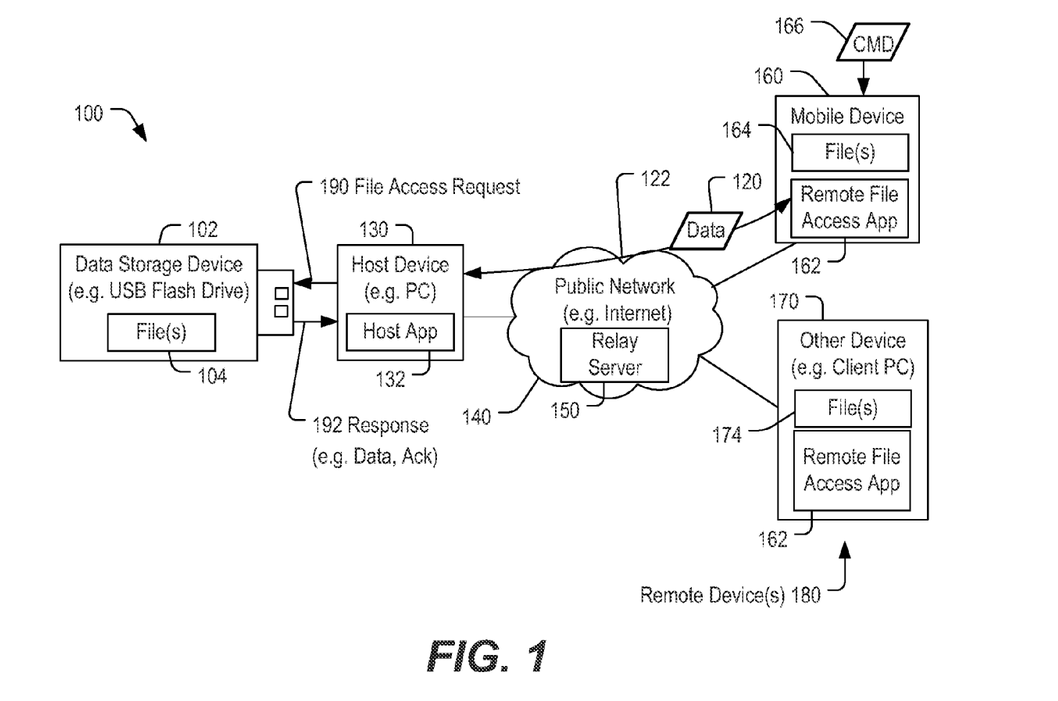
FIG. 1 is a diagram of a first embodiment of a system to provide remote access to a data storage device.

Referring to FIG. 1, a first embodiment of a system to enable access by a remote device to data at a storage device is depicted and generally designated 100. The system 100 includes a data storage device 102 operatively coupled to a host device 130. The host device 130 is communicatively coupled to one or more remote devices 180 via a public network 140. For example, the host device 130 may be coupled to a mobile device 160 and/or another device 170 such as a client personal computer (PC). The host device 130 includes a host application 132, and the remote devices 180 include a remote file access application 162. The applications 132 and 162 enable the remote devices 180 to engage in transfer of data 120 to and from the data storage device 102 via the host device 130.

The data storage device 102 may be a removable memory device, such as a universal serial bus (USB) flash drive. The data storage device 102 includes one or more files 104 that may be accessible to the host device 130 while the data storage device 102 is operatively coupled to the host device 130. For example, the one or more files 104 may include media content such as audio data, video data, or image data, as illustrative examples.

The host device 130 may be configured to provide data to be stored at the data storage device 102 or to request data to be read from the data storage device 102. The host device 130 may include a mobile telephone, a music or video player, a gaming console, an electronic book reader, a personal digital assistant (PDA), a computer, such as a laptop computer, a notebook computer, or a tablet, any other electronic device, or any combination thereof. The host device 130 may receive the host application 132 from the data storage device 102 upon coupling the host device 130 to the data storage device 102, as described with respect to FIG. 3. Alternatively, the host application 132 may be downloaded to the host device 130 from a remote server via the public network 140.

The host device 130 may execute the host application 132 in response to detection of connection of the data storage device 102 to the host device 130. For example, when the host device 130 detects that the data storage device 102 has been plugged in (e.g. at a USB receptacle of the host device 130), the host device 130 may send a message to contact a relay server 150 via the public network 140. The host application 132 may register the host device 130 as a current host for the data storage device 102, and a record of such registration may be stored at the relay server 150 for assistance and location of the data storage device 102 by one or more of the remote devices 180.

In addition, the host application 132 may be configured to cause the host device 130 to engage in the receipt and transfer of data between the data storage device 102 and one or more of the remote devices 180. For example, the host application 132 may be configured to enable the host device 130 to receive requests from one or more of the remote devices 180 for data stored at the data storage device 102, to retrieve the requested data from the data storage device 102, and to send the requested data to the requesting remote device 180. As another example, the host device 130 may be configured to be responsive to a user instruction to retrieve data from the data storage device 102 and to send the data to one or more of the remote devices 180. As another example, the host device 130 may be configured to receive data from one or more of the remote devices 180 and to store the data at the data storage device 102. As yet another example, the host device 130 may be configured to receive via user input at the host device 130 an instruction to pull data from one or more of the remote devices 180 for storage at the data storage device 102.

The mobile device 160 may be a device such as a mobile telephone, a music or video player, a portable gaming device, an electronic book reader, a personal digital assistant (PDA), a computer, such as a laptop computer, a notebook computer, or a tablet, any other portable electronic device, or any combination thereof. The mobile device 160 may store one or more files 164 at a local memory that has a smaller storage capacity than the data storage device 102. The mobile device 160 may not have a connector that is compatible with a connector of the the data storage device 102 (e.g. a USB connector) and therefore may not be capable of being directly connected to the data storage device 102.

The mobile device 160 may implement the remote file access application 162. The remote file access application 162 may be downloaded from a server, such as a mobile application server, to enable a user of the mobile device 160 to request to transfer (i.e., send, receive, or both) data or files between the mobile device 160 and the data storage device 102. For example, a user of the mobile device 160 may enter user input (e.g. a command 166) indicating a request to send one or more of the files 164 at the mobile device 160 to be stored to the data storage device 102. The remote file access application 162 may contact the relay server 150 to obtain an address of a current host of the data storage device 102, such as the host device 130. The remote file access application 162 may receive an indication of an address of the host device 130 from the relay server 150 and may initiate a communication session 122 with the host application 132 of the host device 130. The communication session 122 between the remote file access application 162 and the host application 132 may enable a user of the mobile device 160 to send data to be stored at the data storage device 102 and/or to retrieve data from the data storage device 102 to be stored locally at the mobile device 160 and may appear to a user as if the data storage device 102 were local to the mobile device 160.

The other device 170 may also execute a version of the remote file access application 162 to enable a user of the other device 170 to remotely access data at the data storage device 102 (i.e. to send data and/or to receive data) via the host device 130. For example, different versions of the remote file access application may be configured to function for a variety of device types and/or operating systems. The other device 170 may store one or more files 174 that may be transferred to the data storage device 102 by the remote file access application 162, such as to provide a remote storage for backup purposes. The other device 170 may be a client PC device, such as a work computer of a user of the data storage device 102.

The relay server 150 may be configured to store one or more records including account information corresponding to a user of the data storage device 102. For example, the relay server 150 may be configured to receive a user credential from the host application 132 and to locate a user account associated with the received user credential, such as to register an address of the host device 130 as a current location of the data storage device 102. In addition, the relay server 150 may be configured to receive communication from the remote file access application 162 including a user credential and to locate a user account associated with the user credential. For example, when the mobile device 160 sends a credential to the relay server 150, the relay server 150 may search one or more user account records to locate a user account associated with the received credential. The relay server 150 may identify, via the located user account, that a requested data storage device 102 is coupled to the host device 130 and may provide a network address of the host device 130 to the remote file access application 162 at the mobile device 160. The remote file access application 162, having received the address of the host device 130, may send a request via the network 140 to access data at the data storage device 102 via the host device 130.

During operation, a user of the data storage device 102 may plug the data storage device 102 into the host device 130. The host device 130, upon detection of the data storage device 102 being coupled to the host device 130, may cause the host application 132 to send information to the relay server 150 indicating that the data storage device 102 is coupled to the host device 130. The relay server 150 may update information associated with an account of the user of the data storage device 102.

The user may later launch the remote file access application 162 via the mobile device 160, such as to retrieve a music file stored on the data storage device 102. The mobile device 160 may initiate a communication session with the relay server 150, such as via one or more wireless networks and/or one or more wireline networks, to contact the relay server 150 and to locate an address of a current host device of the data storage device 102. The relay server 150 may receive a credential from the remote file access application 162, locate corresponding information for the data storage device 102, and provide to the remote file access application 162 information enabling the remote file access application 162 to communicate with the host device application 132 at the host device 130. Having received information enabling contact with the host device 130, the remote file access application 162 may establish the communication session 122 with the host application 132 of the host device 130. To illustrate, the communication session may be unsecured or may include secured communication, such as by using transport layer security (TLS) or a secure sockets layer (SSL). During the communication session 122, the remote file access application 162 may send one or more requests for retrieval of one or more files or other data from the data storage device 102.

In response to receiving a request for data retrieval, the data to be retrieved from the data storage device 102, the host application 132 may read the requested data from the data storage device 102 and may send the requested data 120 to the remote file access application 162 at the mobile device 160 via the public network 140. To illustrate, the host device 130 may send a file access request 190 to the data storage device 102 and may receive a response 192 from the data storage device 102. For example, the file access request 190 may be a request to store data to the data storage device 102 and the response 192 may be an acknowledgement (Ack) that the data is stored. As another example, the file access request 190 may be a request to retrieve data from the data storage device 102, and the response 192 may include the requested data.

Although the system 100 illustrates the data storage device 102 coupled to the single host device 130, the data storage device 102 may be removable and capable of being coupled to any of multiple host devices, each of which may run a version of the host application 132. For example, when a user of the data storage device 102 unplugs the data storage device 102 from the host device 130, the host device 130 may send a message to the relay server 150 indicating that the host device 130 is no longer a host of the data storage device 102. When the user subsequently plugs the data storage device 102 into another host device (not shown), the other host device may initiate a registration with the relay server 150 to indicate that the other host device is the host of the data storage device 102. Subsequent inquiries from one or more of the remote devices 180 to locate a host of the data storage device 102 result in the relay server 150 identifying the other host device, rather than the host device 130, as a host of the data storage device 102.

As a result, a user of the data storage device 102 may couple the data storage device 102 into any host device that may be coupled to the public network 140 and may subsequently access data at the data storage device 102 via any remote device that also has access to the public network 140. The data storage device 102 may therefore be used as an additional storage for remote devices, such as mobile devices or client PCs, and need not be tethered to a single host device but may instead be removed from one or more host devices and coupled to one or more other host devices according to convenience or a preference of the user. Using the data storage device 102 as an extended storage for the one or more remote devices 180 enables the remote devices 180 to access a larger amount stored data than can be stored at local memory and enables convenient transfer of content captured at the remote devices 180 to a personal storage device of a user.

Figure 2:
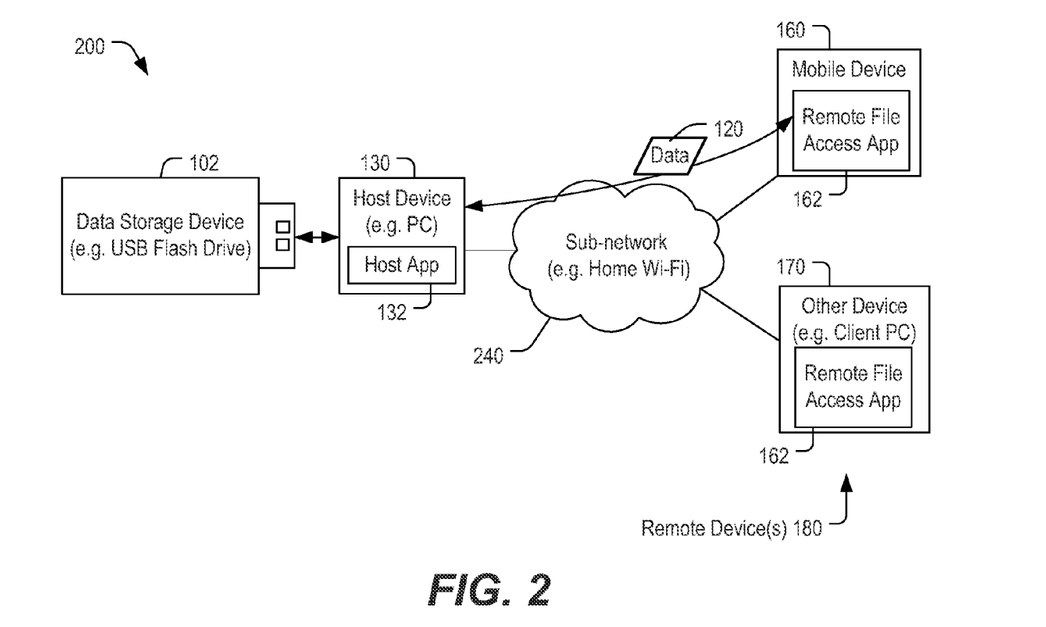
FIG. 2 is diagram of a second embodiment of a system to provide remote access to a data storage device.

Referring to FIG. 2, a second particular embodiment of a system to enable file access to a data storage device by a remote device is depicted and generally designated 200. The system 200 includes the data storage device 102 of FIG. 1 coupled to the host device 130 running the host application 132. The host device 130 may be coupled to the one or more remote devices 180, including the mobile device 160 and the other device 170, via a sub-network 240. For example, the sub-network 240 may be a home network compliant with an Institute of Electrical and Electronics Engineers (IEEE) 802.11 standard, such as a home WI-FI® (trademark of Wi-Fi Alliance, Austin, Tex.) network.

Coupling of one or more of the remote devices 180 to the host device 130 via the sub-network 240 enables data transfer to and from the data storage device 102 by the remote device. To illustrate, files such as video files and/or image files that may have been acquired at the mobile device 160 may be transferred to the data storage device 102 for backup and/or to free memory space of the mobile device 160. As another example, content such as music, news, applications, or other content that may be stored at the data storage device 102 may be transferred via the sub-network 240 to be stored at the mobile device 160.

The mobile device 160 may run the remote file access application 162 that is configured to communicate with the host application 132 when the mobile device 162 enters the sub-network 240. To illustrate, in response to the mobile device 160 entering a WI-FI home sub-network 240 and acquiring a network address, the remote file access application 162 may send a query to contact the host device 130 via the WI-FI home sub-network 240 and may initiate data exchange. As a result, the system 200 may be used for automatic backup of data at the mobile device 160 when the mobile device 160 enters the sub-network 240. As another example, the remote file access application 162 at the other device 170 may be configured to perform a data mirroring operation in response to another data storage device being connected to the other device 170. To illustrate, when the data storage device 102 is coupled to the host device 130 and another data storage device is coupled to the other device 170, an automated data synchronization process may be executed by the host device 130 and the other device 170 to transfer data between the data storage devices so that each data storage device stores a copy of data at the other data storage device. As a result, a backup copy of specified (or all) data at each data storage device may be maintained with relatively little user involvement. In addition, although data mirroring of multiple data storage devices is described within the context of the sub-network 240 in the system 200 of FIG. 2, it should be understood that data mirroring functionality may also, or alternatively, be implemented via the public network 140 of the system 100 of FIG. 1.

The system 100 of FIG. 1 and the system 200 of FIG. 2 each enable a use case where a user of a remote device 180 can push or pull data from the remote device 180 to the data storage device 102 or from the data storage device 102, respectively. For example, a user of a remote device 180 may send a copy of data stored at the remote device 180 to be stored to the data storage device 102 (i.e. a "push"). In another example, a user of a remote device 180 may instruct the remote device 180 to retrieve data from the data storage device 102 to be stored at the remote device 180 (i.e. a "pull"). Similarly, a user of the host device 130 can cause the host device 130 to initiate a pull of data from one or more remote devices 180 to be stored to the data storage device 102. Similarly, the user of the host device 130 may cause the host device 130 to push data retrieved from the data storage device 102 to one or more of the remote devices 180. Also, the systems of FIG. 1 and FIG. 2 each enable backup use cases where a user may backup mobile device data to the data storage device 102 according to one or more rules, such as during a designated time period or in response to the remote device 180 being connected to a home network, such as the sub-network 240 of FIG. 2.

Figure 3:
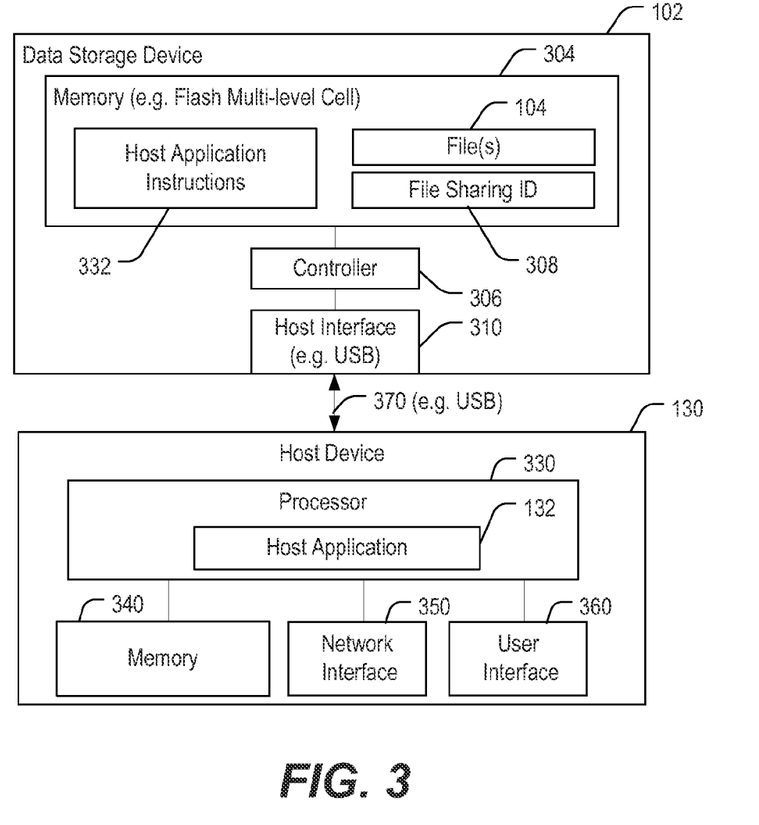
FIG. 3 is a diagram of a particular embodiment of the data storage device and host device of FIGS. 1-2.

Referring to FIG. 3, a particular embodiment of the data storage device 102 of FIGS. 1-2 operatively coupled to the host device 130 is depicted. The data storage device 102 includes a controller 306 coupled to a memory 304 and to a host interface 310, such as a USB interface/connector. The memory 304 includes the one or more files 104, a host application 332, and a file sharing identifier (ID) 308. The host application 332 may be an executable set of instructions that may be executable at the host device 130 to run the host application 132 For example, the host application 132 may be a copy of the host application 332 or may be modified from the host application 332, such as decompressed, reformatted, unencrypted, or otherwise modified.

The data storage device 102 may be a removable memory device, such as a USB flash drive or a memory card, such as a Secure Digital SD® card, a microSD® card, a miniSD.™ card (trademarks of SD-3C LLC, Wilmington, Del.), a MultiMediaCard.™ (MMC.™) card (trademark of JEDEC Solid State Technology Association, Arlington, Va.), or a CompactFlash® (CF) card (trademark of SanDisk Corporation, Milpitas, Calif.). Alternatively, the data storage device 102 may be a solid state drive (SSD) or may be embedded memory in the host device 130, such as eMMC® (trademark of JEDEC Solid State Technology Association, Arlington, Va.) memory and eSD memory, as illustrative examples.

The memory 304 may be a nonvolatile memory of a flash device, such as a NAND flash device, a NOR flash device, or any other type of flash device. The memory 304 includes multiple storage elements, such as memory cells of a multilevel cell (MLC) memory. The controller 306 may be configured to receive memory access requests from the host device 130 and to process data read from the memory 304.

The host device 130 may be configured to provide data to be stored at the memory 304 or to request data to be read from the memory 304. For example, the host device 130 may include a mobile telephone, a music or video player, a gaming console, an electronic book reader, a personal digital assistant (PDA), a computer, such as a client PC, a laptop computer, a notebook computer, or a tablet, any other electronic device, or any combination thereof.

The host device 130 includes a processor 330, a memory 340, a network interface 350, and a user interface 360. The network interface 350 enables the host device 130 to communicate via one or more of the network 140 of FIG. 1, the network 240 of FIG. 2, one or more other networks, or any combination thereof. The user interface 360 may include a user input device, such as a touchscreen and/or keyboard, that enables the host device 130 to receive user input. The host device 130 may receive the host application file 332 from the data storage device 102, such as via an autorun or autoplay function, and may execute the host application file 332 at the processor 330 to run the host application 132. The host application 132 may be configured to identify the data storage device 102 as one of multiple data storage devices that may be associated with the host application 132 by querying and retrieving the file sharing ID 308 (e.g. a unique identifier) from the memory 304.

During operation, the data storage device 102 may be operatively coupled to the host device 130, such as via a universal serial bus (USB) 370. Upon connection via the USB 370, the host device 130 may automatically search for an autoplay or autorun application at the data storage device 102. The autoplay or autorun application may cause the host application file 332 to be loaded to the host device 130, installed (if not already installed at the host device 130), and executed. In a particular embodiment, the data storage device 102 may have multiple versions of the host application file 332 for different host operating systems to provide compatibility for a variety of host devices. In another embodiment, the host application file 332 may be provided in a format that is platform-independent, such as an interpreted language or bytecode. The data storage device 102 may therefore be plugged into virtually any host device and may upload and provide connectivity software to enable the host device to register as a host of the data storage device 102 for remote file access by one or more of the remote devices 180 of FIG. 1 or FIG. 2. Alternatively, the host application file 332 may instead provide an address or instructions to enable the host device 130 to download the host application 132 from a remote server, such as from the relay server 150 or another server. Similarly, the file sharing ID 308 may be accessed by the host application 132 and provided during registration with a relay server, such as the relay server 150 of FIG. 1, so that the relay server may distinguish between a host of the data storage device 102 and a host of one or more other data storage devices associated with a same user account as the data storage device 102. For example, a user may have multiple data storage devices that each have a different file sharing ID. Remote devices may locate a particular data storage device (e.g. as specified by a user) that is accessible via one or more host devices according the file sharing ID of the particular storage device.

Figure 4:
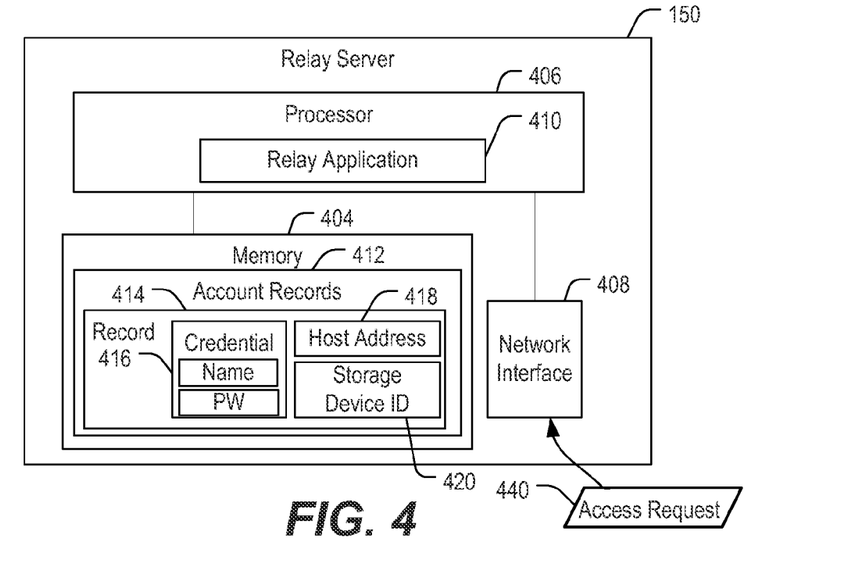
FIG. 4 is a diagram of a particular embodiment of the relay server of FIG. 1.

Referring to FIG. 4, a particular embodiment of the relay server 150 of FIG. 1 is depicted. The relay server 150 includes a memory 404 coupled to a processor 406. A network interface 408 is coupled to the processor 406 and enables communication via one or more networks, such as the public network 140.

The memory 404 includes one or more account records 412 that may be associated with one or more user accounts of file sharing applications. For example, one or more of the account records 412 may be associated with the data storage device 102 of FIG. 1. The relay server 150 includes a relay application 410 that may be executed by the processor 406 to enable a remote device, such as one of the remote devices 180, to engage in file transfer or data transfer with the data storage device 102 via the current host device 130 of the data storage device 102. For example, the relay application 410 may be configured to receive a communication from the host device 130 indicating that the data storage device 102 has been coupled to the host device 130. The indication may include a credential, such as a user name and password, that the relay application 410 may use to identify one or more corresponding account records 412. The relay application 410 may update the corresponding account record 412 to indicate an address of the host device 130 as an address of the current host of the data storage device 102.

The relay application 410 may also be configured to receive one or more communications from a remote device, such as an access request 440 from the mobile device 160 of FIG. 1, including a credential such as a user name and password and also including an indicator of the data storage device 102 that is requested to be accessed by the remote device. The relay application 410 may locate the one or more account records 412 associated with the indicated credential and may locate an address of the host device corresponding to the identified data storage device, such as the address of the host device 130 of FIG. 1. For example, the relay application 410 may be configured to locate a representative account record 414 that includes a credential 416 (that includes a username and a password), a storage device identifier 420, such as the file sharing ID 308 of FIG. 3, and an address 418 of a host device that most recently registered as the host of the data storage device having the identifier 420.

The relay server 150 may be configured to respond to communication from a remote device by providing an address of the host device coupled to a requested data storage device. In this manner, the relay server 150 may enable a host device coupled to a data storage device to be registered as a network destination for data transfers to and from the data storage device and may provide the host information to any requesting authorized remote device for out-of-band data transfer between the remote device and the data storage device. Alternatively, or in addition, the relay application 410 may be configured to receive requests for data transfer from one or more remote devices and may forward the requests for data transfer to a host device of the requested data storage device. In this case, the relay server 150 does not provide an address of the host device to the requesting remote device, but may instead forward the request to the host device. The host device, in one embodiment, may open an out-of-band communication session with the remote device. In another embodiment, the host device may instead send responses to the relay server 150 to be forwarded to the requesting remote device.

Figure 5:
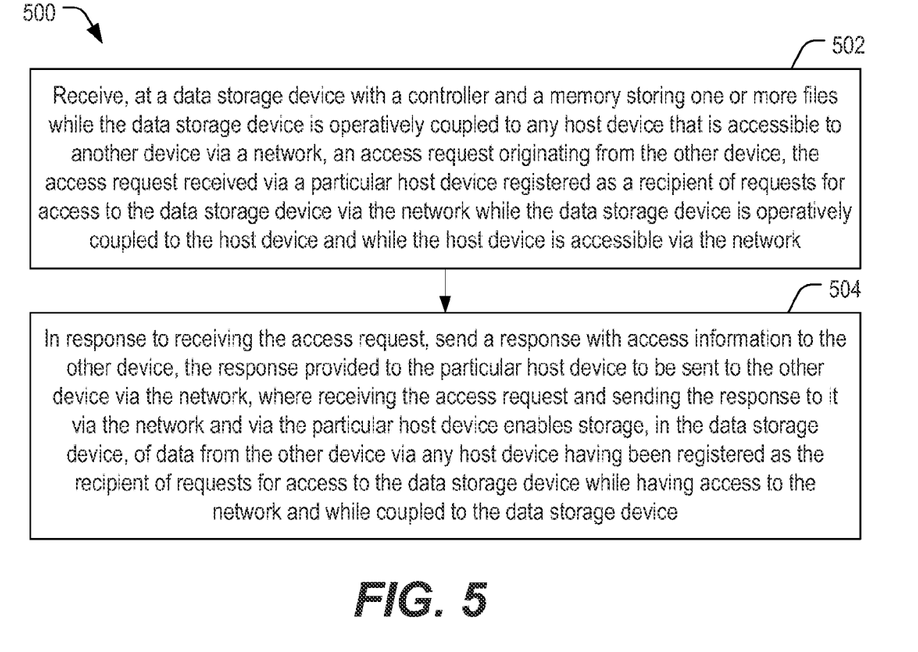
FIG. 5 is a flow diagram that illustrates a particular embodiment of a method that may be performed by the data storage device of FIGS. 1-2.

Referring to FIG. 5, a particular embodiment of a method 500 is illustrated that may be performed by a data storage device with a controller and a memory storing one or more files while the data storage device is operatively coupled to any host device that is accessible to another device via a network. For example, the method 500 may be performed by the data storage device 102 of FIGS. 1-3. The network may be a public network, such as the public network 140 of FIG. 1. As another example, the network may be a private network, such as the private network 240 of FIG. 2.

An access request originating from the other device is received at the data storage device, at 502. The access request is received via a particular host device registered as a recipient of requests for access to the data storage device via the network while the data storage device is operatively coupled to the host device and while the host device is accessible via the network. The other device may be a mobile device. For example, the access request may be the file access request 190 of FIG. 1 that is received at the data storage device 102 from the mobile device 160 via the host device 130.

The access request may be a forwarded request received via the host device 130 from the relay server 150 of FIG. 1. The forwarded request from the relay server may include a credential from the other device to enable determination by the relay server that the other device is authorized to access the data storage device. For example, the credential may include a username and password. that correspond to an account associated with a user of the data storage device. The access request and the response are communicated via a secured communication session, such as described with respect to the communication session 122 of FIG. 1.

In response to receiving the access request, a response that includes access information is sent to the other device, at 504. The response is provided by a data storage device to the particular host device to be sent to the other device via the network. For example, the response may be the response 192 that is provided by the data storage device 102 to the host device 130 to be sent to the mobile device 160.

As an example, the access request may be a request to read a file from the memory and the access information may include data read from the file. As another example, the access request may be a request to write a file to the memory and the access information may include an acknowledgement that the file is written to the memory. To illustrate, the file may include media content originating at the other device (e.g. image data recorded by a camera of the other device).

Receiving the access request and sending the response to it via the network and via the particular host device enables storage, in the data storage device, of data from the other device via any host device having been registered as the recipient of requests for access to the data storage device while having access to the network and while coupled to the data storage device. As a result, the data storage device may be used as additional memory that is accessible to the other device via the network while the data storage device is coupled to a host device having access to the network.

Figure 6:
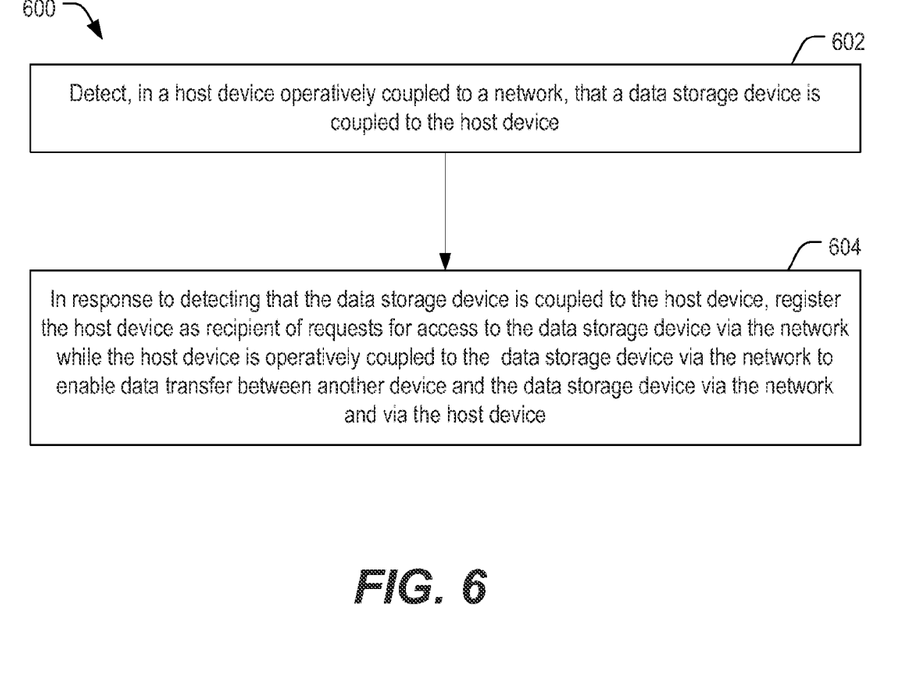
FIG. 6 is a flow diagram that illustrates a particular embodiment of a method that may be performed by the host device of FIGS. 1-2.

Referring to FIG. 6, a particular embodiment of a method 600 is illustrated that may be performed by a host device operatively coupled to a network. For example, the method 600 may be performed by the host device 130 of FIGS. 1-3.

The method 600 includes detecting that a data storage device is coupled to the host device, at 602. For example, the host device 130 of FIG. 1-3 may detect a physical interface connection to the data storage device 102. To illustrate, the host device may detect a connection via USB plug detection in a USB receptacle of the host device.

In response to detecting that the data storage device is coupled to the host device, the method 600 includes registering the host device as recipient of requests for access to the data storage device via the network while the host device is operatively coupled to the data storage device to enable data transfer between another device and the data storage device via the network and via the host device, at 604. Registering the host device may include sending a credential and an address of the host device to a relay server coupled to the network, such as to the relay server 150 of FIG. 1.

Data transfer between the other device and the data storage device may include storing data from the other device to the data storage device. For example, the mobile device 160 of FIGS. 1-2 may send the data 120 to the host device 130 and the host device 130 may store the data at the data storage device 102. Alternatively, or in addition, the data transfer may include sending data from the data storage device to the other device. For example, the data storage device 102 of FIGS. 1-2 may send the data 120 to the host device 130, and the host device 130 may send the data 120 to the mobile device 160.

The data transfer may be initiated via a user input at the host device. For example, a user of the host device 130 of FIGS. 1-3 may provide input via the user interface 360 of FIG. 3 indicating that data is to be transferred from the data storage device 102 to the mobile device 160 and/or from the mobile device 160 to the data storage device 102. Alternatively, the data transfer may be initiated by the other device. For example, a user of the mobile device 160 of FIGS. 1-2 may provide input, such as the command 166, via a user interface of the mobile device 160 indicating that data is to be transferred from the data storage device 102 to the mobile device 160 and/or from the mobile device 160 to the data storage device 102.

Registering the host device as the host of the data storage device enables a user of a remote device, such as a user of the mobile device 160 of FIGS. 1-2, to locate and access the data storage device for data storage and retrieval. The remote device can access a record of the registration of the host device, such as the record 414 of FIG. 4, to locate the data storage device and therefore does not have to keep track of the data storage device as the data storage device moves from host device to host device. As a result, the data storage device may be used as additional memory that is conveniently accessible to the remote device via the network while the data storage device is coupled to a host device having access to the network.

Figure 7:
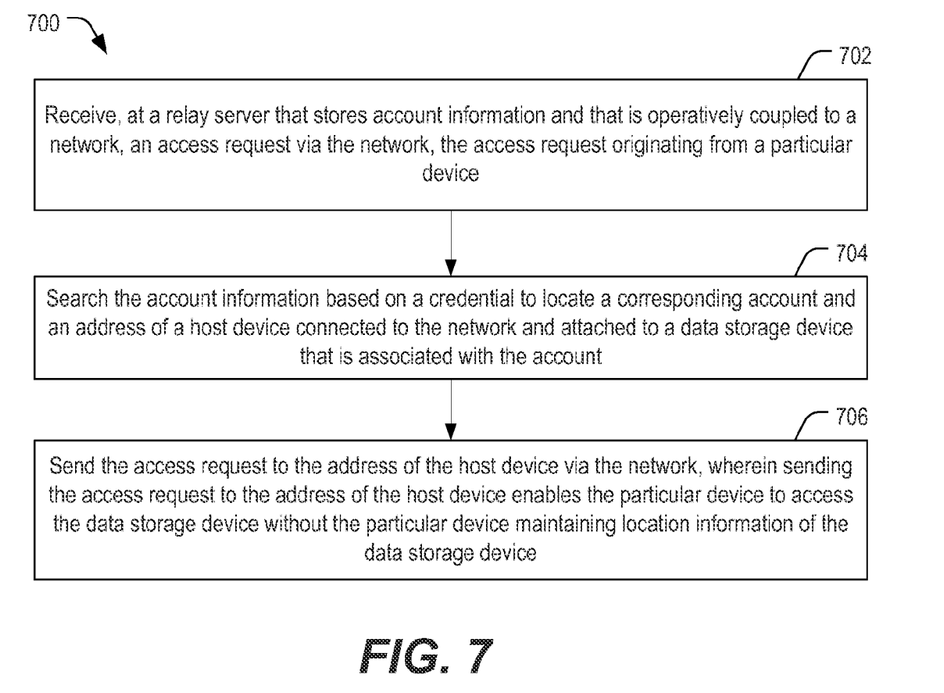
FIG. 7 is a flow diagram that illustrates a particular embodiment of a method that may be performed by the relay server of FIG. 1.

Referring to FIG. 7, a particular embodiment of a method 700 is illustrated that may be performed by a relay server that stores account information and that is operatively coupled to a network. For example, the method 700 may be performed by the relay server 150 of FIG. 1 and FIG. 4.

The method 700 includes receiving, via the network, an access request originating from a particular device, at 702. The access request includes a credential. For example, the access request may be the access request 440 of FIG. 4 and may include a username and password corresponding to a user of the mobile device 160 of FIGS. 1-2.

The account information is searched based on the credential to locate a corresponding account and an address of a host device connected to the network and attached to a data storage device that is associated with the account, at 704. The access request may be sent to the address of the host device via the network, at 706. Sending the access request to the address of the host device enables the particular device to access the data storage device without the particular device maintaining location information of the data storage device.

File access information originating from the data storage device may be received via the network. The file access information may include the credential. For example, the data 120 read from the data storage device 102 of FIGS. 1-2 may be received at the relay server 150 and may include a username and password. The relay server 150 may search the account information (e.g. may search the account records 412) based on the credential to locate the account and a destination address of the particular device, such as a destination address of the mobile device 160 of FIGS. 1-2. The relay server 150 may send the file access information to the destination address of the particular device (e.g. the mobile device 160) via the network.

By keeping track of which host device is a most recently registered host of the data storage device, the relay server enables a user of a remote device, such as the mobile device 160 of FIG. 102, to locate and access the data storage device for data storage and retrieval. As a result, the data storage device may be used as additional memory that is accessible to the remote device via the network while the data storage device is coupled to a host device having access to the network.

Figure 8:
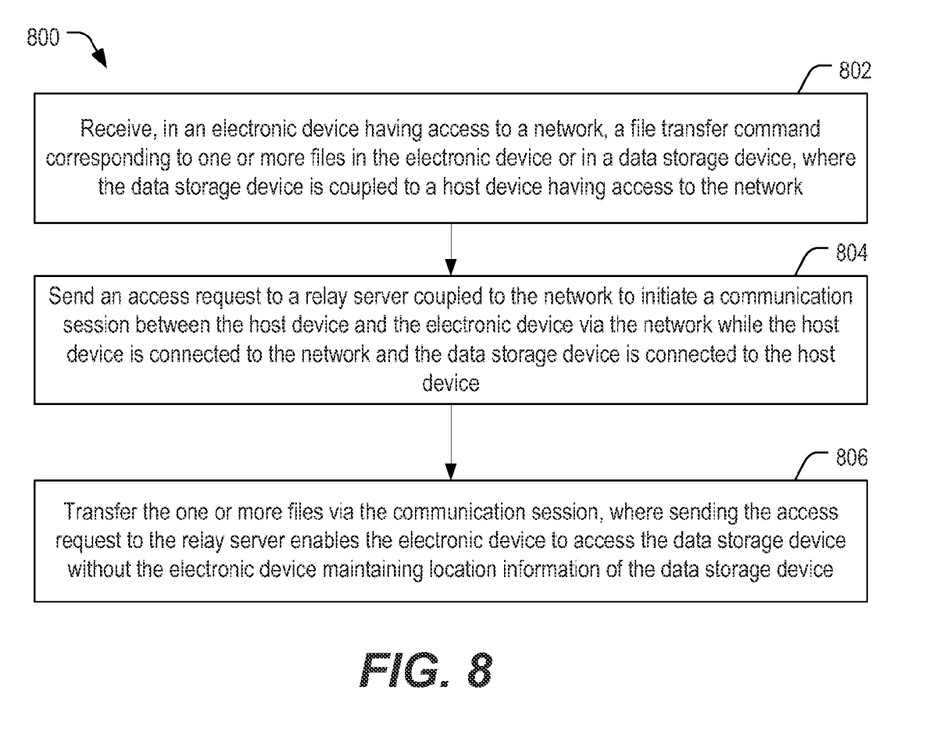
FIG. 8 is a flow diagram that illustrates a particular embodiment of a method that may be performed by a device of FIGS. 1-2 that is remote from the data storage device.

Referring to FIG. 8, a particular embodiment of a method 800 is illustrated that may be performed by an electronic device having access to a network. For example, the method 800 may be performed by any of the remote devices 180 of FIGS. 1-2.

A file transfer command corresponding to one or more files in the electronic device or in a data storage device, at 802 is received by the electronic device. The data storage device is coupled to a host device having access to a network. For example, the file transfer command may be the command 166 received at a user interface of the mobile device 160 of FIG. 1 to send files or data to, or to retrieve files or data from, the data storage device 102.

An access request is sent to a relay server coupled to the network to initiate a communication session between the host device and the electronic device via the network while the host device is connected to the network and the data storage device is connected to the host device, at 804. The access request may include a credential corresponding to an account associated with the data storage device. For example, the relay server 150 of FIG. 1 may receive the access request and may identify the record 414 associated with the credential 416 to identify the corresponding host address 418. The address of the host device 130 may be received at the mobile device 160 via the network 140, and the communication session 122 may be established using the address of the host device 130.

The one or more files are transferred via the communication session, at 806. Sending the access request to the relay server enables the electronic device to access the data storage device without the electronic device maintaining location information of the data storage device. A user of the electronic device may therefore use the data storage device as an extended data storage of a local memory of the electronic device.

Although various components depicted herein are illustrated as block components and described in general terms, such components may include one or more microprocessors, state machines, or other circuits configured to enable a data storage device, such as the data storage device 102 of FIG. 1, to perform the particular functions attributed to such components, or any combination thereof For example, the controller 306 of FIG. 3 may represent physical components, such as processors, state machines, logic circuits, or other structures.

The controller 306 may be implemented using a microprocessor or microcontroller programmed to be responsive to data read and write instructions from the host device 130. In a particular embodiment, the controller 306 includes a processor executing instructions that are stored at the memory 304. Alternatively, or in addition, executable instructions that are executed by the processor may be stored at a separate memory location that is not part of the memory 304, such as at a read-only memory (ROM).

In a particular embodiment, the data storage device 102 may be a portable device configured to be selectively coupled to one or more external devices. For example, the data storage device 102 may be a removable device such as a universal serial bus (USB) flash drive, SSD or removable memory card. In a particular embodiment, the data storage device 102 includes a non-volatile memory, such as a Flash memory (e.g., NAND, NOR, Multi-Level Cell (MLC), Divided bit-line NOR (DINOR), AND, high capacitive coupling ratio (HiCR), asymmetrical contactless transistor (ACT), or other Flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
in a data storage device with a controller and a memory storing one or more files, performing, while the data storage device is operatively coupled to a host device that is accessible to a second device via a network:
providing a host application to the host device to enable registration of the host device at a server accessible over the network, the registration including sending to the server a file sharing identifier associated with the data storage device, wherein registration results in the registered host device being designated as a recipient of requests for the data storage device associated with the file sharing identifier, and wherein the server comprises a relay server accessible to the second device;
receiving an access request originating from the second device, the access request received via the registered host device, wherein the access request is a forwarded request received from the server, and wherein the forwarded request includes a credential from the second device to enable a determination that the second device is authorized to access the data storage device; and
in response to receiving the access request, sending a response with access information to the second device, the response provided to the registered host device to be sent to the second device via the network, wherein receiving the access request and sending the response via the registered host device enables storage, in the data storage device, of data from the second device.

2. The method of claim 1, wherein the network is a public network.

3. The method of claim 1, wherein the credential includes a username and password.

4. The method of claim 3, wherein the username and password correspond to an account associated with a user of the data storage device.

5. The method of claim 1, wherein the access request and the response are communicated via a secured communication session.

6. The method of claim 1, wherein the network is one of a private network or a combination of a private network and a public network.

7. The method of claim 1, wherein the second device is a mobile device.

8. The method of claim 1, wherein the access request is a request to read a file in the memory and wherein the access information includes data read from the file.

9. The method of claim 1, wherein the access request is a request to write a file in the memory and wherein the access information includes an acknowledgement that the file is written to the memory.

10. The method of claim 9, wherein the file includes media content.

11. A data storage device comprising:
a memory storing a host application;
a host interface; and
a controller coupled to the memory and to the host interface, the controller including a processor and configured to:
respond to an access request originating from a second device and received via the host interface while the data storage device is operatively coupled to a host device accessible to the second device via a network, and
provide the host device with the host application to enable registration of the host device at a server accessible over the network, the registration including sending information via the network to the server, wherein the information includes a file sharing identifier associated with the data storage device, wherein the host device is designated as a recipient of requests for access to the data storage device via the network, wherein the server comprises a relay server coupled to the network and accessible to the second device, and wherein the access request is a forwarded request that is received from the server and that includes a credential from the second device to enable a determination that the second device is authorized to access the data storage device.

12. The data storage device of claim 11, wherein the controller is configured to provide the host application to the host device upon coupling the data storage device to the host device.

13. The data storage device of claim 11, wherein the host application is further configured to enable removal of the host device as the designated recipient upon removal of the data storage device from the host device.

14. A method comprising:
in a host device operatively coupled to a network and accessible to a second device via the network, performing:
detecting that a data storage device is coupled to the host device;
in response to the detecting, registering by a host application, at a server accessible via the network, the host device as a recipient of requests for access to the data storage device to enable data transfer between the second device and the data storage device via the network and via the host device, wherein the registering of the host device includes sending via the network to the server a file sharing identifier associated with the data storage device, wherein the server comprises a relay server coupled to the network; and
in response to an access request, sending access information to the second device via the network, wherein the access request is a forwarded request received from the server, and wherein the forwarded request includes a credential from the second device to enable a determination that the second device is authorized to access the data storage device.

15. The method of claim 14, wherein registering the host device includes sending a credential and an address of the host device to the server.

16. The method of claim 14, wherein the data transfer includes sending data from the second device to the data storage device.

17. The method of claim 14, wherein the data transfer includes sending data from the data storage device to the second device.

18. The method of claim 14, wherein the data transfer is initiated via user input at the host device.

19. The method of claim 14, wherein the data transfer is initiated by the second device.

20. A method comprising:
in a relay server that stores account information and that is operatively coupled to a network, performing:
updating an account based on registration information received, via the network, from a host device coupled to a data storage device, wherein the registration information includes a file sharing identifier associated with the data storage device;
receiving, via the network, an access request originating from a second device, the access request including a credential to enable a determination that the second device is authorized to access the data storage device;
searching the account information based on the credential;
locating the account based on the credential, the account including an address of the host device attached to the network; and
forwarding the access request to the address of the host device via the network, wherein forwarding the access request to the address of the host device enables the second device to access the data storage device.

21. The method of claim 20, wherein the credential includes a username and password.

22. The method of claim 20, further comprising:
receiving, via the network, file access information originating from the data storage device, the file access information including the credential;
searching the account information based on the credential to locate the account and a destination address of the second device; and
sending the file access information to the destination address of the second device via the network.

23. A method comprising:
in an electronic device having access to a network, performing:
receiving a file transfer command corresponding to one or more files in a data storage device, the data storage device coupled to a host device having access to the network and registered at a relay server;
sending an access request to the relay server coupled to the network to cause initiation of a communication session between the host device and the electronic device via the network and forwarding of the access request to the host device; and
transferring the one or more files via the communication session,
wherein sending the access request to the relay server includes sending a file sharing identifier associated with the data storage device enabling the electronic device to access the data storage device based on the access request sent to the relay server, and wherein the access request includes a credential to enable a determination that the electronic device is authorized to access the data storage device.

24. The method of claim 23, further comprising receiving, via the network, an address of the host device and establishing the communication session using the address of the host device.

25. The method of claim 23, wherein the credential corresponds to an account associated with the data storage device.

* * * * *